April 27, 1937.  J. C. WELLS  2,078,297
OPHTHALMIC MOUNTING
Filed Dec. 12, 1934
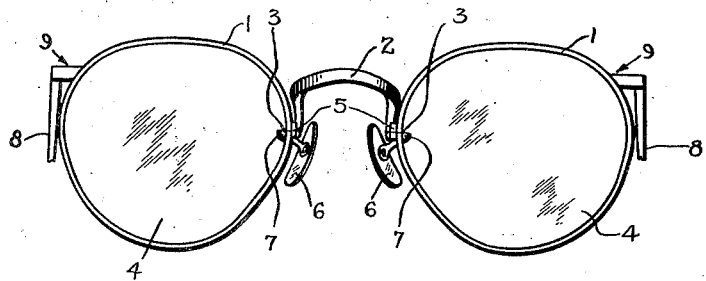
FIG. I
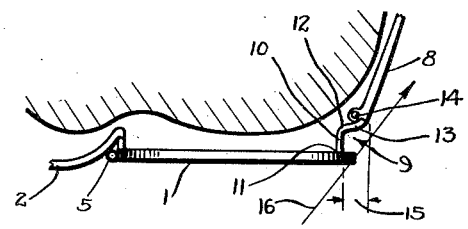
FIG. II
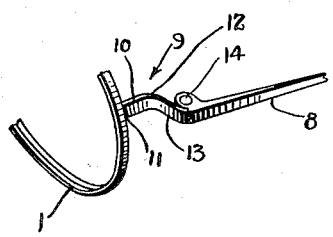
FIG. III
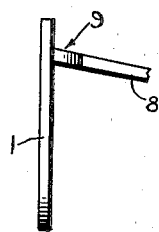
FIG. IV
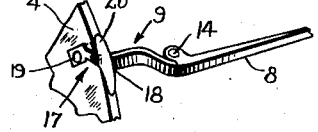
FIG. V
INVENTOR
Joel C. Wells
BY
Harry H. Styll
ATTORNEY Patented Apr. 27, 1937

2,078,297

UNITED STATES PATENT OFFICE 2,078,297

OPHTHALMIC MOUNTING

Joel C. Wells, Southbridge, Mass., assignor to American Optical Company, Southbridge, Mass., a voluntary association of Massachusetts Application December 12, 1934, Serial No. 757,148

2 Claims. (Cl. 88—53)

This invention relates to improvements in ophthalmic mountings and has particular reference to improved supports for the temples or sides of such mountings.

One of the principal objects of the invention is to provide temple supporting means whereby the normal narrowing effect of connecting the temples or sides high up adjacent the tops of the lenses will be positively compensated for, and the increased width of unusually wide features may be adjustably compensated for, thereby reducing the number of sizes of mountings necessary to be carried in stock by the dealer and enabling a more accurate and comfortable fit for most individuals.

Another object is to provide relatively long adjustable temple supports of the above character which will be substantially invisible and inconspicuous when the mounting is viewed from the front and which will permit of a wide adjustment of the temple connections whereby the temples may be positioned in or out, up or down or varied in length as desired.

Another object is to provide supports of the above character which are intimately related with the face of the wearer so as to eliminate projections at the sides of the mounting by means of which the mounting may be accidentally struck and dislodged from the face with a danger of breaking the lenses.

Another object is to provide temple supports which are relatively rigid but ductile and pliable and which are shaped and proportioned to blend with the temples to produce a pleasing effect when on the face.

One of the principal objects of the invention is to provide improved means whereby the endpieces or joints of temples are located behind the plane of the lenses whereby the width of the spectacle in the plane of the lenses will be that of the width of the lenses only.

Another object is to provide simple, inexpensive and neat appearing means which will accomplish all of the objects and advantages of the invention.

Other objects and advantages of the invention will become apparent from the following description taken in connection with the accompanying drawing and it will be apparent that many changes may be made in the details of construction and arrangement of parts without departing from the spirit of the invention as expressed in the accompanying claims. I, therefore, do not wish to be limited to the exact details shown and described as the preferred form only has been shown by way of illustration.

Referring to the drawing:

Fig. I is a front elevation of an ophthalmic mounting embodying the invention;

Fig. II is a fragmentary plan view of the mounting showing the temple support and temple in relation with the face;

Fig. III is a fragmentary perspective view of a temple support and temple showing them in attachment with a lens supporting rim;

Fig. IV is a fragmentary side elevation of the mounting showing the blended relation of the temple support and temple and showing the angle of the said support relative to the plane of the lenses;

Fig. V is a view similar to Fig. III showing a modified form of the invention.

In the past spectacle frames or mountings have had their temple connections or endpieces extending from the frame at the side in the plane of the lenses, thus making the frame very broad in width from the end of one endpiece to the other. In this invention the width of the frame in the plane of the lenses is that of the width of the lenses only, and the compensation for variation in width of foreheads is made to the rear of the plane of the lenses thereby giving many important advantages and considerations both in structure and appearance.

In forming ophthalmic mountings of the type having their temples and endpieces located above the useful field of side vision, there is a narrowing effect of the distance between the temples due primarily to the fact that above the center line of the lenses the edges thereof retreat toward the nose. This narrowing of the distance between the temples made it necessary to stock a greater number of sizes and mountings than was usual in the past with mountings of the type having the temples and endpieces connected adjacent the horizontal center line of the lenses.

In instances wherein the features of an individual were unusually wide, the optician sometimes found it necessary to fit the patient with larger lenses or with lenses having a greater diameter horizontally crosswise thereof so as to position the temple supports and temples sufficiently far apart to avoid objectionable contact with the sides of the face. This practice not only had the disadvantage that it compelled the optician to carry in stock spectacle frames, lenses and temples of a wider range of size, but it caused the finished mounting to be excessively bulky and unbecoming and also caused portions thereof to project outwardly at the sides whereby the mounting could be easily struck and displaced from the face with the danger of bending and distorting the mounting and of breaking the lenses.

It, therefore, is one of the primary objects of applicant's invention to overcome the above difficulties by providing a mounting which may be fitted to the requirements of most individuals and in which the supporting parts of the mounting will be light and durable in construction and substantially invisible and inconspicuous in use, the width of the spectacle being that of the lenses in the plane of the lenses and the compensating means in the rear thereof.

Referring more particularly to the drawing wherein like characters of reference designate like parts throughout the several views, the device embodying the invention, as shown in Figures I to IV, inclusive, comprises a pair of lens holding members, which in this instance are in the form of lens rims 1 connected by a bridge member 2 and having a split portion 3 adjacent the nasal sides to permit the insertion or removal of the lenses 4. The split portions 3 are each provided with a telescoping tube connection 5 of a prior art type held in telescoped relation with each other by a screw or other suitable means to provide means for securing the split ends of the rims together. These split portions may be placed at any location desired.

The bridge 2 is provided with nose pads or guards 6 adjustably supported by guard arms 7. The said nose pads or guards may be loosely or rigidly attached to said arms as desired.

The mounting is held on the face by the temples or sides 8 attached to the temple supports or parts 9.

The temple supports 9, as shown in Fig. II each have a relatively long and slender portion 10 extending rearwardly in a direction substantially normal to the plane of its respective lens rim 1 when viewed from the top and extending downwardly relative to the plane of said rim when viewed from the side. The relatively long rearwardly extending portion is attached at 11 adjacent its forward end to the rear and upper temporal side of the lens rim 1, and is provided with a relatively sharp bend at 12 and with a relatively long and slender outwardly deflected portion 13 lying substantially parallel with the plane of the rim at a point substantially spaced from said plane. The outwardly deflected portion 13 is provided with a temple hinge connection 14 positioned normally in the rear of the portion 13 to be concealed by said portion and to which the temple 8 is pivotally attached. The object of providing the supports or arms 9 with a relatively long rearwardly extending portion 10 is to provide means whereby the said arm may be adjusted up and down or in and out as desired, and the object of providing the outwardly deflected portion 13 is to provide means whereby the temple hinge connection may be positioned outwardly an amount indicated at 15, so as to clear the sides of the head. This arrangement provides temple supports which normally space the temples the required amount to fit most individuals and also provides means whereby the temples may be fitted to the requirements of individuals whose features are unusually wide. The said supports are removed from the plane of the lenses so as to be substantially invisible when viewed in the direction indicated by the arrow 16 and are closely associated with the face of the wearer to remove undesirable projections at the sides of the mounting by which the mounting may be accidentally struck and dislodged from the face. Due to the fact also that the long adjustable portions extend rearwardly of the lens holding means a substantial amount prior to their being deflected outwardly at 13, the major portion of the supports 9 will be inconspicuous and substantially invisible when the mounting is viewed from the front.

Attention is also directed to the fact that the supports 9 are relatively thin so that they may be easily adjusted and the width thereof is such that they conceal the hinge connections and blend with the width of the temples to form substantially continuous unbroken upper and lower edge lines when viewed from the sides.

It is to be understood that although applicant has preferably attached the supports 9 to the rear of the lens rims 1 they may be secured to the peripheral edges of the rims if desired. The supports in use are preferably attached to the upper temporal sides of the mounting and are angled downwardly from their points of attachment towards the temples and form an acute angle between the plane of the lower portions of the lens rims or lenses. The said supports are formed preferably of a relatively rigid but ductile and pliable material, but it is to be understood that the said supports may be formed resilient if desired and may have portions thereof formed with one or more of the above characteristics.

Referring more particularly to Fig. V, the temple support 9 is shown attached to a lens strap or clamp member 17. The temple support 9 is identical in structure to that shown and described above and may be attached to the rear of the strap as shown at 18 or to the side of the edge engaging portion thereof as desired. The lens strap 17 is of the prior art type having lens face engaging portions 19 for engaging the front and rear surfaces of the lens and an edge engaging portion 20 for engaging the peripheral edge of the lens. The strap may be secured to the lens by a screw or other suitable means extending through an opening formed in the lens as is usual in the prior art.

Referring more particularly to the structural detail of the temple support or arm 9, it is apparent that the outwardly deflected portion 13 provides positive means for compensating for the normal narrowing effect of connecting the temples high up adjacent the top of the lenses and that the relatively long rearwardly extending portion 10 provides adjustable means whereby the increased width of unusually wide features may be compensated for and that through the provision of such supports or arms, a single mounting may be quickly and easily adjusted to the facial requirements of different individuals. These adjustments provide means whereby the temples or sides 8 may be located or positioned clear of the side of the head so that they will not exert a pressure on and cut into the flesh during the use of the mounting. In this manner a comfortable fit may be obtained without having to increase the size of the lenses horizontally as has been usual in many instances in the past.

It is clear that this construction may be used for temples connected above the horizontal center line of the lenses as shown in Fig. I or at the horizontal center line of the lenses, or at any portion vertically that is desired.

It will be seen from Fig. I, that the width of the spectacle from the front appears to be that of the width of the lenses as the rim or edge line of the lens is continuous and unbroken where it crosses the line of the temple connection.

From the foregoing description it will be seen that applicant has provided simple, efficient, and economical means of accomplishing all of the objects and advantages of the invention.

Having described my invention I claim:

1. In a device of the character described for use in combination with a pair of lenses and means adapted to be associated with said lenses for supporting them in spaced relation with each other, lens holding members each having a part shaped to the shape of a portion of the outer temporal edge of each respective lens, a part secured to the rear of each of the lens holding members at points adjacent to but within the limits of the outer temporal edges of the lenses and extending rearwardly in a direction substantially normal to the plane of the lenses when viewed from the top and downwardly at an angle other than normal relative to the plane of the lenses when viewed from the sides, said rearwardly extending parts each terminating in an outwardly turned bent portion at points spaced a substantial distance in the rear of the plane of the lenses and each having a portion extending outwardly from said bends in a direction towards the temporal edges of the respective lenses and curving rearwardly to temple hinge connections and temples secured to said hinge connections, the upper and lower edges and said rearwardly extending parts and portions extending outwardly and curving rearwardly, and the upper and lower edges of the temples when in their positions of use as when on the face of the wearer, all lying substantially along straight lines, when viewed from the sides, intersecting the lens holding means adjacent the attachments of said rearwardly extending parts to said lens holding means.

2. In a device of the character described for use in combination with a pair of lenses and means adapted to be associated with said lenses for supporting them in spaced relation with each other, lens holding members each having a part shaped to the shape of a portion of the outer temporal edge of each respective lens, a part secured to each of the lens holding members at points located above the horizontal meridians of the lenses and within the limits of the outer temporal edges of said lenses along said horizontal meridian and extending rearwardly in a direction substantially normal to the plane of the lenses when viewed from the top and downwardly at an angle other than normal relative to the plane of the lenses when viewed from the sides, said rearwardly extending parts being relatively long and each terminating in a bent portion at points spaced a substantial distance in the rear of the plane of the lenses and each having a portion extending outwardly from said bends in a direction towards the temporal edges of the respective lenses and terminating in temple hinge connections and temples secured to said hinge connections, the outer or side faces of said temples and the adjacent outer surfaces of the respective portions to which the temples are pivotally connected being flush with respect to each other when the temples are extended as when in their position of use on the face of the wearer and the upper and lower edges of said temples and said rearwardly and outwardly extending portions to which the temples are pivotally connected, all lying substantially along straight lines, when viewed from the sides, intersecting the lens holding means adjacent the attachments of said rearwardly extending parts to said lens holding means.

JOEL C. WELLS.